United States Patent [19]

Loverich

[11] Patent Number: 5,359,962
[45] Date of Patent: Nov. 1, 1994

[54] CENTER-SPAR FISH PEN

[75] Inventor: Gary F. Loverich, Bainbridge Island, Wash.

[73] Assignee: Nor'Eastern Trawl Systems, Inc., Bainbridge Island, Wash.

[21] Appl. No.: 192,810

[22] Filed: Feb. 7, 1994

Related U.S. Application Data

[63] Continuation of Ser. No. 968,388, Oct. 29, 1992, abandoned.

[51] Int. Cl.$^5$ ............................................. A01K 63/00
[52] U.S. Cl. ..................................... 119/223; 43/103; 24/115 K; 24/115 L
[58] Field of Search ....................... 119/223, 208, 239; 43/102, 103, 104, 4, 7; 24/115 H, 115 K, 115 L; 441/32, 133

[56] References Cited

U.S. PATENT DOCUMENTS

| | | | |
|---|---|---|---|
| 1,614,600 | 1/1927 | Cleaver | 43/103 |
| 2,606,350 | 8/1952 | French | 24/115 L |
| 3,691,994 | 9/1972 | McPherson | 119/3 |
| 3,702,709 | 11/1972 | Shaffer | 24/115 K |
| 4,252,081 | 2/1981 | Smith | 119/3 |
| 4,337,553 | 7/1982 | Fischer | 24/115 H |
| 4,380,213 | 4/1983 | Blair et al. | 119/3 |

Primary Examiner—Gene Mancene
Assistant Examiner—Todd E. Manahan
Attorney, Agent, or Firm—Christensen, O'Connor, Johnson & Kindness

[57] ABSTRACT

A spar-buoy pen includes a net that is held open by a single elongated, substantially vertically oriented center spar. The pen of this invention includes either a fixed center spar or a floating spar buoy that is substantially vertically aligned. Several pairs of radially disposed lines extend outward from the center spar at two locations that are longitudinally spaced apart from one another along the length of the center spar. A net is fitted over the radial lines such that the opposed top and bottom sections of the net are held apart from each other by the lines. The ends of the radial lines distal from the center spar are attached to anchor assemblies that urge the lines away from the center spar to hold the net in the open state. The net is further constructed so that a small portion of the top section of the net is located above the surface of the water. The top section of the net is formed with a drop panel that allows personnel in tender vessels to enter the pen space defined by the net to carry out culture operations on the marine life contained therein.

24 Claims, 5 Drawing Sheets

CENTER-SPAR FISH PEN

This application is a continuation application based on prior copending application Ser. No. 07/968,388, filed on Oct. 29, 1992 now abandoned.

FIELD OF THE INVENTION

This invention relates generally to a fish pen for containing marine life and, more particularly, to a fish pen that allows easy access to the marine life contained therein.

BACKGROUND OF THE INVENTION

Fish pens are used in the commercial fishing industry to contain marine life, such as fish and shellfish, in their natural, open-water, environment. By containing fish in fish pens they can be readily raised and harvested. Many fish pens include some type of floating horizontal frame member from which a closed net that actually defines the pen space is suspended. Some fish pens are further provided with some type of netting that is suspended from the frame at or above the waterline. This netting prevents marine life from jumping over the frame to either enter or leave the pen and serves as a barrier that prevents birds from entering the fish pens and preying on the fish being raised therein.

While current fish pens are useful, there are some limitations associated with their use. Large waves, the type that develop during foul weather, can be intense enough to break apart the frames that form the skeletal structures for these pens. Normally sized waves, the type that are always present in the ocean, continually move the frames and any ancillary floats up and down. This repetitive movement continually stresses the pen netting and the associated frame members to which the netting is attached. If a pen is subjected to this movement for a long enough period of time, and the range of movement is wide enough, the netting and associated frame members may become stressed to the point where either the net rips or the frame members fracture. Moreover, still another disadvantage of these pens is that the frame prevents personnel from using tender vessels to enter the center area of the pen. Consequently, personnel are limited to tending the contents of the pen from around its outer perimeter as defined by the frame.

One alternative to the conventional frame-and-net pens is a spar-buoy pen as described in the applicant's assignee's U.S. Pat. No. 5,007,376. The pen of this disclosure includes a net that is suspended from at least three vertically oriented spar buoys. Each buoy is connected to a separate anchor assembly. The anchor assemblies are arranged to urge the individual spar buoys away from each other. Since the spar buoys are pulled away from each other, they cooperate to hold the net in an open state so as to define a pen for containing marine life. The pen of this assembly has a number of advantages over the previous pens that include a horizontal frame from which the pen nets are suspended. Since this pen does not include horizontal frame members, small tender vessels can cross the net so that the contents of the pen can be tended from the center of the net.

While the multispar-buoy pen has advantages over conventional, floating frame-type pens, there are some limitations associated with its use. For example, there are occasionally instances when wave motion can cause two buoys to move out of synchronization with each other. When this happens the lines connecting the buoys, including the actual net, may be stressed to the point where they break. Should this happen, the net will open to the sea and the marine life therein will be able to escape. Consequently, multispar buoys are not normally installed in locations where the buoys are regularly induced into this type of motion.

SUMMARY OF THE INVENTION

This invention is directed to a new and useful net pen for containing marine life. More particularly, this invention is related to a center-spar net pen with a net that, in addition to being closed around its outer perimeter, is closed from top to bottom. The pen of this invention further includes a single, centerlocated buoy that holds the net open.

In one preferred embodiment or the center spar-buoy pen of this invention, the net is formed with top and bottom sections that have the profile of a four-sided pyramid. The top and bottom net sections are connected by a center section that has a rectangular, or box-like, profile. The top section is formed with a drop panel that is separate from the other portions of the net that form the top section. A single, vertically oriented spar buoy is located in the center of the net and extends from the top of the net to the bottom of the net. The net is held in place by a rigging assembly that includes radial lines that extend outward from both the top and bottom of the buoy. The rigging assembly also includes a set of lines attached to the drop panel that are used to selectively raise and lower that panel. The ends of the radial lines are connected to separate anchor assemblies. The anchor assemblies are configured to urge the radial lines associated therewith away from the center buoy.

When the center spar-buoy pen of this invention is in place, the center buoy and the radial lines cooperate to hold the net open. Since the top and bottom sections of the net are attached to opposed ends of the buoy, these sections are held vertically apart from each other. The radial lines, in combination with the associated anchor assemblies, form suspension strands that support, or limit, movement of the adjacent portions of the netting to prevent the top section of the netting from collapsing toward the surface of the water and the bottom section of the netting from floating upward. Consequently, at all times the net of this pen defines a space below the water line for containing marine life.

An advantage of the center spar-buoy pen of this invention is that it relies on only a single elongated member, the vertically oriented buoy, to hold the net open in both the vertical and horizontal directions. There are no horizontally oriented elements that float on the surface that are affected by wave forces. Furthermore, the vertically oriented spar buoy is less prone to waveinduced stress and fracture than other, conventional, horizontally oriented support members. Still another advantage of the spar-buoy pen of the invention is that all one has to do to tend the contents of the pen from the center of the net is to simply lower the drop panel. A small tender vessel, such as a flat-bottomed boat, can be floated over the edge of the net to allow persons access to the center of the pen. Moreover, the top section of the net serves as a barrier that prevents birds of prey from capturing marine life in the pen, marine life from escaping the pen by jumping over the net, or unwanted marine life from using the same technique to enter the net.

Still another advantage of the spar-buoy pen of this invention is that the lines forming the rigging are connected together by gridline connectors, each of which comprises a number of grommets that are rotatably fitted to a pair of spaced-apart cheek plates. The grommets are attached to the cheek plates so that their axes are typically, but not always, parallel to each other. The ends of the lines that are attached to the gridline connectors are formed with eye-loops that are fitted around the individual grommets. By connecting the lines to the gridline connector, the stress to which both the lines and the components forming the gridline connector are exposed is kept to a minimum. This serves to further enhance the useful lifetime of the components forming the net pen of this invention.

BRIEF DESCRIPTION OF THE DRAWINGS

The invention is defined with particularity in the appended claims. The advantages of this invention may be understood by referring to the following detailed description in which:

DETAILED DESCRIPTION OF THE PREFERRED EMBODIMENT

Figure 1:
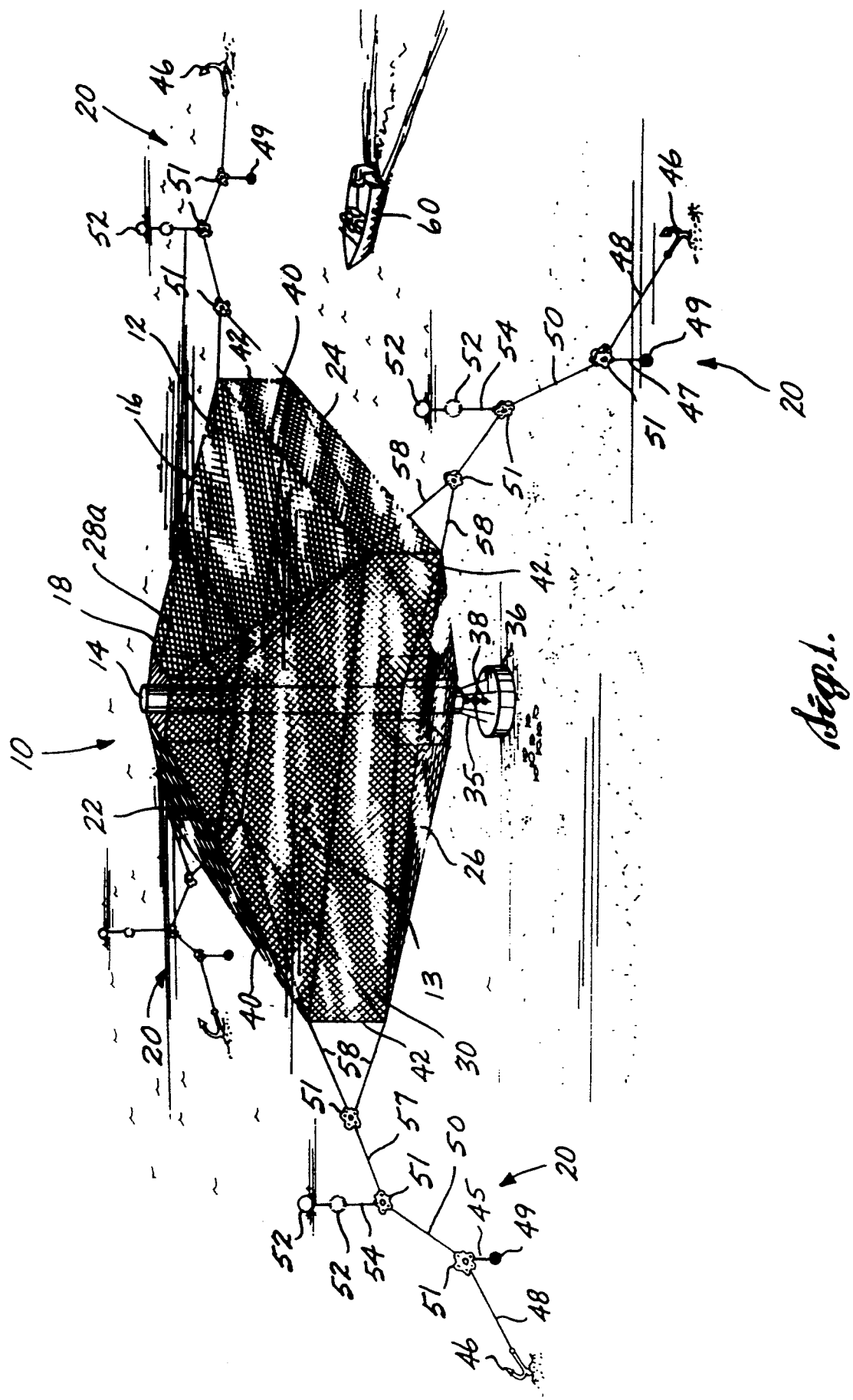
FIG. 1 is a perspective view of a spar-buoy pen system with the floating spar buoy of this invention.

FIG. 1 illustrates one preferred embodiment of a spar-buoy net pen 10 of this invention. The spar-buoy net pen 10 includes a multisection net 12 that defines a pen space 13 for containing marine life. The net 12 is held open so as to define the pen space 13 by a single, center-located vertically oriented spar buoy 14 to which the top and bottom of the net are attached. The net 12 is attached to the spar buoy 14 by a rigging system 16. The rigging system 16 includes a set of radial lines 18 that extend outward from the top and bottom of the spar buoy 14. The ends of the radial lines 18 are attached to separate anchor assemblies 20. The anchor assemblies 20 are configured and positioned to urge the radial lines 18 away from the spar buoy 14. The radial lines 18 thus function as suspension strands that hold the net 12 away from the spar buoy 14.

Figure 2:
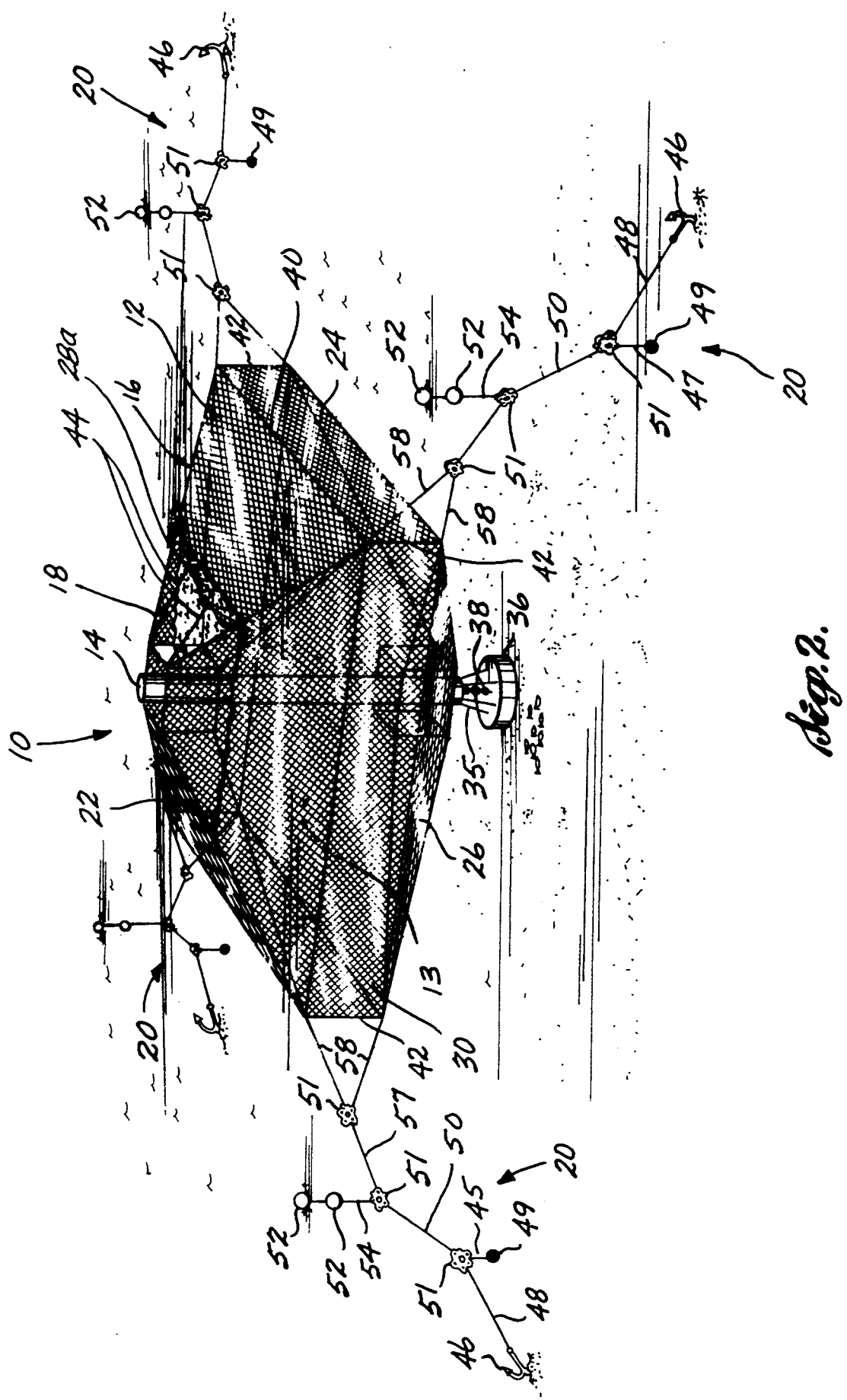
FIG. 2 is a perspective view of the spar-buoy pen of FIG. 1 illustrating how one of the panels defining the pen space can be dropped to allow a tender vessel into the space.

The net 12 is formed of three multipanel sections that are connected together. There is a top section 22, a center section 24, and a bottom section 26. The bottom section 26, center section 24, and all but the top one-third to onehalf of the top section 22 of the net are located below the water line so as to define the pen space 13. The portion of the top section 22 that extends above the water line serves as a barrier to prevent marine life from entering or leaving the pen space 13. The top portion also prevents birds from entering the pen and preying on the marine life therein. In the illustrated embodiment of the invention, the top and bottom sections 22 and 26, respectively, are each formed of four generally triangularly shaped panels 28, which panels are ranged to form a pyramid. The top section 22 is formed with a movable drop panel, panel 28a, that is connected to the other panels by adjustable lines that form part of the rigging system 16. The drop panel 28a can be raised or lowered to allow entry into the pen space 13 as illustrated in FIG. 2. The center section 24 is formed from four vertically oriented panels 30, each of which has a rectangular profile. In the version of the invention illustrated in FIG. 1, the panels 30 are at right angles to each other so that the net center section 24 has a rectangular appearance. In some preferred embodiments of the invention, the individual panels 28 and 30 forming the net 12 are assembled as a single unit. In other preferred embodiments of the invention, two or more of the panels 26, 28, and/or 30 are formed as separate units that are attached together to form the net 12. In these versions of the invention, plastic ties, zippers, or other suitable fasteners may be used to secure the panels 28 and/or 30 together.

Spar buoy 14 is an elongated buoy that, in the illustrated embodiment of the invention, has a cylindrical profile. The spar buoy 14 is constructed to have a center of buoyancy that is located above its center of gravity. This construction forces the spar buoy 14 to float upright in a substantially vertical position. In some preferred embodiments of the invention, the spar buoy 14 has a diameter of between approximately 36 and 60 inches or more and an overall length of approximately 40 to 70 feet. The spar buoy 14 is weighted so that approximately 90 percent of its overall length is normally located below the water line. When the spar buoy 14 is so constructed, the top-located radial lines can be secured to the buoy so that a portion of the net top section 22 extends above the water line. A circular damper plate 36 is attached to the bottom of the spar buoy by a chain 35 attached to the center of the plate and four connecting lines 38 attached to the perimeter of the plate. The damper plate 36 substantially reduces, if not entirely eliminates, the vertical movement of the spar buoy 14 so that in rough seas the pen 10 does not wildly gyrate. The chain 35 provides a relatively strong mechanical connection between the spar buoy 14 and the damper plate 36. The lines 38 hold the plate in a horizontal orientation.

The rigging system 16 comprises a number of different sets of lines that are arranged to suspend the net 12 in position. The radial lines 18 that extend downward from the top of spar buoy 14 are secured to the individual net top sections 22 along the border of the individual top sections. The radial lines 18 that extend upward from the bottom of the spar buoy are secured to the individual net bottom sections 26 along the border between the individual bottom sections. A set of horizontally oriented transverse lines 40 extends between the radial lines 18 along the edges of the net 12 where the top section 22 and bottom section 26 interface with the panels 30. A set of vertically oriented longitudinal breast lines 42 extends between the opposed top and bottom radial lines 18. The longitudinal edges of the center section panels 30 are secured to the longitudinal breast lines 42. The rigging system 16 further includes a set of drop lines 44 (shown in FIG. 2) that are attached to the top section of the drop panel 28a that can be manipulated to selectively raise and lower the drop panel 28a.

Each anchor assembly 20 is attached to the ends of a separate pair of opposed top and bottom radial lines 18. Each anchor assembly 20 includes an anchor 46 that is located on the floor of the body of water some distance away from the outer perimeter of the net 12. For example, in a pen 10 that has a diagonal dimension (corner-to-opposed-corner length) of 200 feet, anchors may be spaced 325 to 350 feet from the spar buoy 14. A mooring line 48 is connected to the anchor 46 and extends toward the adjacent corner of the net 12. The opposed end of the mooring line is connected to a tension weight 49 by way of a supplemental line 45. As will be discussed hereinafter in detail, mooring line 48 and supplemental line 45 are actually attached to a gridline connector 51. Also attached to the gridline connector 51 is a riser line 50. The opposed end of the riser line 50 is attached to a gridline connector 51 to which a spring line 57 is also attached. A set of vertically aligned floats 52, two shown, is also attached to the gridline connector 51 by a pair of float lines 54. The opposed end of the spring line 57 is connected to a gridline connector 51. Also connected to gridline connector 51 are a pair of bridle lines 58 that extend from the free ends of the adjacent top- and bottom-located radial lines 18.

When the spar-buoy pen 10 of this invention is assembled, the spar buoy 14 floats upright in the water so that just the small upper portion of the buoy extends above the water line. The tension imposed by the anchors 46 on the ends of the radial lines 18 serves to urge the radial lines outward, away from the spar buoy 14. The tensioning weights 49 impose a downward force on the lines connected to the radial lines 18 as the pen 10 rises and falls with the tides or shifts position laterally in response to the currents. The floats 52 redirect the force horizontally so that the radial lines 18 and other elements of the rigging system 16 are subjected to only the outwardly directed horizontal force owing to the placement of the anchors 46. Since the net 12 is attached to the radial lines 18, the net is similarly urged outward, away from, the spar buoy 14. Since the top section 22 of the net is attached to the radial lines that extend outward from the top of the net, and the bottom section 26 of the net is suspended from the radial lines 18 attached to the bottom of the buoy 14, the radial lines serve to hold the top and bottom sections of the net away from each other so that the net is held open in the vertical dimension as well as along the horizontal dimension. The net 12 thus defines the pen space 13 in which marine life can be contained.

The spar-buoy pen 10 of this invention requires only a single rigid element, the spar buoy 14, to hold the net 12 open. There are no horizontally oriented floating members that can be unduly stressed due to wave motions. Since there is only the single spar buoy 14, the overall cost of providing the pen 10 is relatively low. Still another advantage of the single-spar construction of this pen is that, since there is only the single rigid floating member holding the net 12 open, the risk of the lines of the pen becoming unduly stressed, owing to the out-of-phase vibrations of multiple floating members, is eliminated.

Another advantage of the spar buoy 10 of this invention is that the perimeter of the pen space 13 is defined by the outer perimeter of the net 12. There are no rigid floating members that would restrict access to the center of the pen space. Consequently, persons can use a tender vessel 60, diagrammatically depicted in FIG. 1, to traverse the net 12 into the pen space 13. This makes it possible for personnel to tend the contents of the pen 10 from its center as opposed to being restricted to working around its perimeter. Furthermore, instruments can be mounted to the spar buoy 14 so that they can be located in the center of the pen space 13. This ensures that the instruments can adequately measure the environmental conditions in the center of the pen space 13 as opposed to being restricted to making measurements from around the perimeter of the pen. Tending equipment, such as automatic feeding equipment, can similarly be mounted to the spar buoy 14 so as to maximize the utility of the equipment. Furthermore, the top section 22 of the net 12 serves to totally enclose the pen space 13 from above the water line. Marine life is thus prevented from jumping into or out of the pen space 13. This barrier also prevents birds from entering the pen space and preying on the marine life therein.

Figure 3:
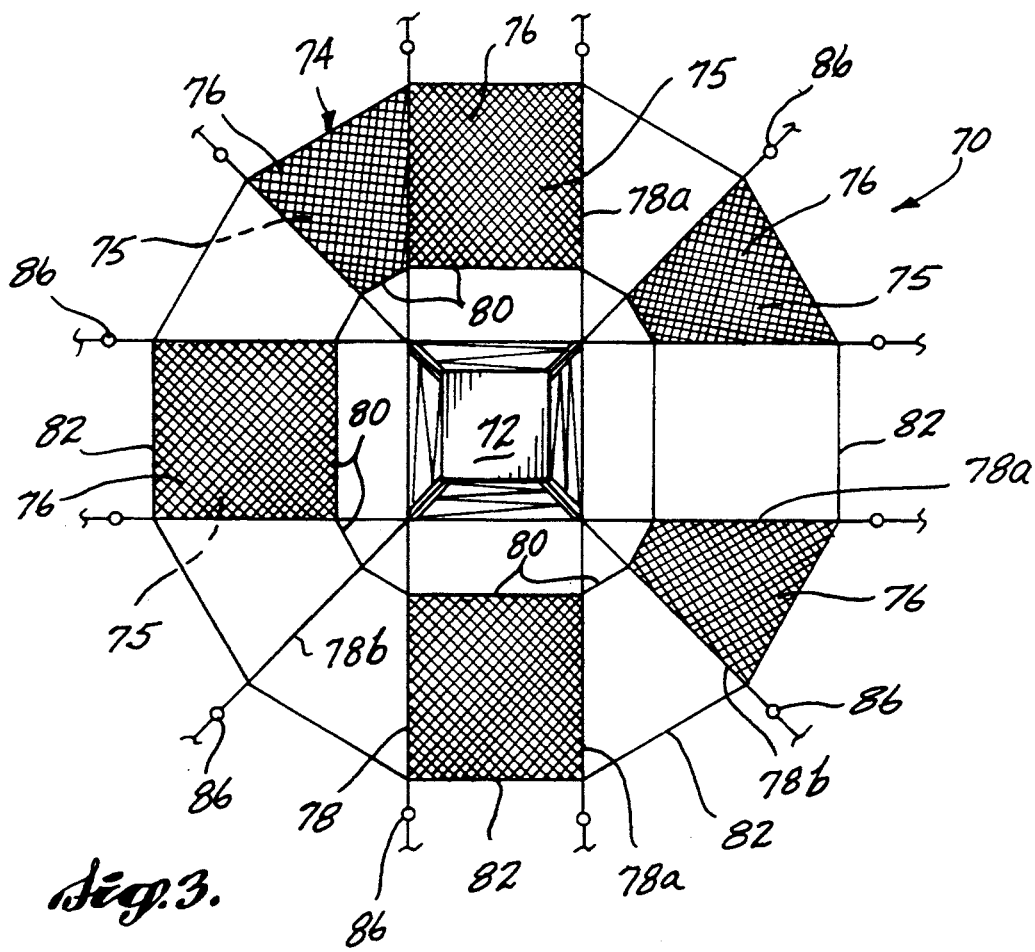
FIG. 3 is a top view of an alternative version of the spar-buoy pen system of this invention wherein the pen system includes multiple pens and the netting forming the pens is suspended from a vertical jacket that is fixed in place.
Figure 4:
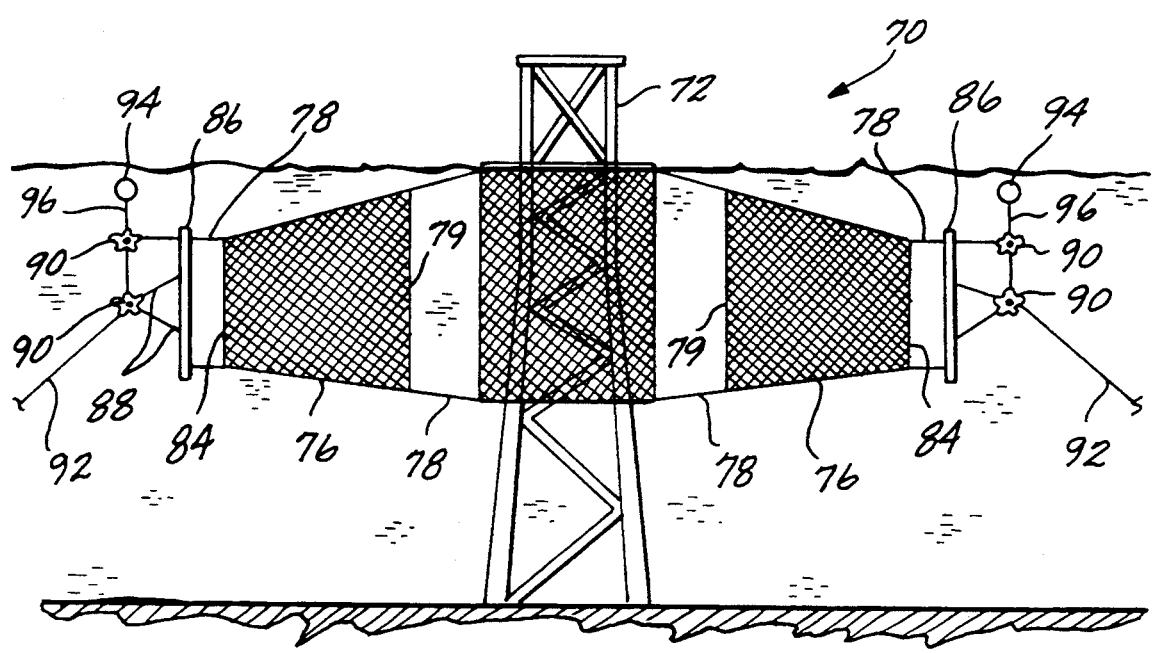
FIG. 4 is a side view of the alternative version of the pen of FIG. 3.

An alternative center spar pen 70 of this invention is described with respect to FIGS. 3 and 4. In this version of the invention, the invention is assembled around an elongated tower secured to the floor of the ocean, such as an abandoned offshore oil platform 72. A rigging system 74 is suspended from the platform 72 and urged away from the platform by anchor assemblies, not illustrated, similar to the previously described anchor assemblies 20 (FIG. 1). Net panels 76 are suspended from the rigging system 74 to define pen space 75 for containing marine life.

Rigging system 74 includes a number of radial lines 78 that extend outward from platform 72. In the illustrated versions of the invention, the radial lines are arranged so that three radial lines 78 extend outward from the top and bottom of each corner of the platform 72. Two outer radial lines 78a extend out perpendicular to each other and a third radial line 78b extends out 45° between the outer lines. A first set of inner frame lines 80, which are spaced slightly away from the platform 72, extends between the top radial lines 78. Inner located vertical lines 79 extend between each pair of top and bottom radial lines 78 at the points where the inner frame lines 80 cross the radial lines. A second set of inner frame lines 80 extends around the bottom radial lines 78 and is located directly underneath the first set of frame lines 80. The radial lines 78 are also connected together by a set of outer frame lines 82 that extends between the radial lines adjacent and slightly inboard of the outer ends of the radial lines. A first set of outer frame lines 82 connects the top radial lines 78 together and a second set of outer frame lines 82 connects the bottom radial lines. Outer vertical lines 84 extend between the top and bottom radial lines at the points where the outer frame lines 80 intersect the radial lines. The outer vertical lines 84 are shorter than the inner vertical lines 79. The difference in length between the two sets of vertical lines 79 and 84 gives the rigging system 74 an inward, or narrowing, taper away from the platform 72.

The outer ends of each pair of top and bottom radial lines 78 are connected to a spar buoy 86 that is spaced away from the rest of the rigging system. In the illustrated version of the invention, radial lines 78 extend out parallel from the rigging system 74. A pair of spaced-apart breast lines 88 extend out from the spar buoy 86 and are connected to a common gridline connector 90. The spar buoy 86 is urged outward, away from the platform 72, by a riser leg 92 that forms part of a mooring line that is part of the anchor assembly of the pen 70. The downward force of the anchor assembly is offset by a float 94 that is connected to the gridline connector 90 by a float line 96. Float 94 is stabilized by an auxiliary line 91 that extends from gridline connector 90 to the top of the spar buoy 86.

The net panels 76 are suspended from the radial lines 78, the inner frame lines 80, the inner vertical lines 81, the outer frame lines 82 and the outer vertical lines 84. The net panels 76 are suspended from the rigging system 74 so as to form the enclosed pen space 75. As seen best in FIG. 3, the net panels 76 may be arranged so that the individual net spaces 75 are either spaced from each other or adjacent each other. In an embodiment of the invention wherein the net is dimensioned to define a pen 70 having a volume of 40,000 cubic meters, the anchor assembly of this embodiment of the invention may be provided by tensioning weights 49 (FIG. 1) that may have a mass of between approximately 2,000 and 10,000 pounds. The spar buoys 86 have a diameter of approximately four feet and have an overall length of approximately 60 feet.

The center-spar pen 70 of this embodiment of the invention provides a convenient means for recycling abandoned offshore oil platforms 72 as fish farms. The relatively wide spacing of the spar buoys 86 away from each other makes it possible for a tender vessel to approach the net so that drop panels can be lowered and the contents of the various pen spaces 75 can be tended.

Figure 5:
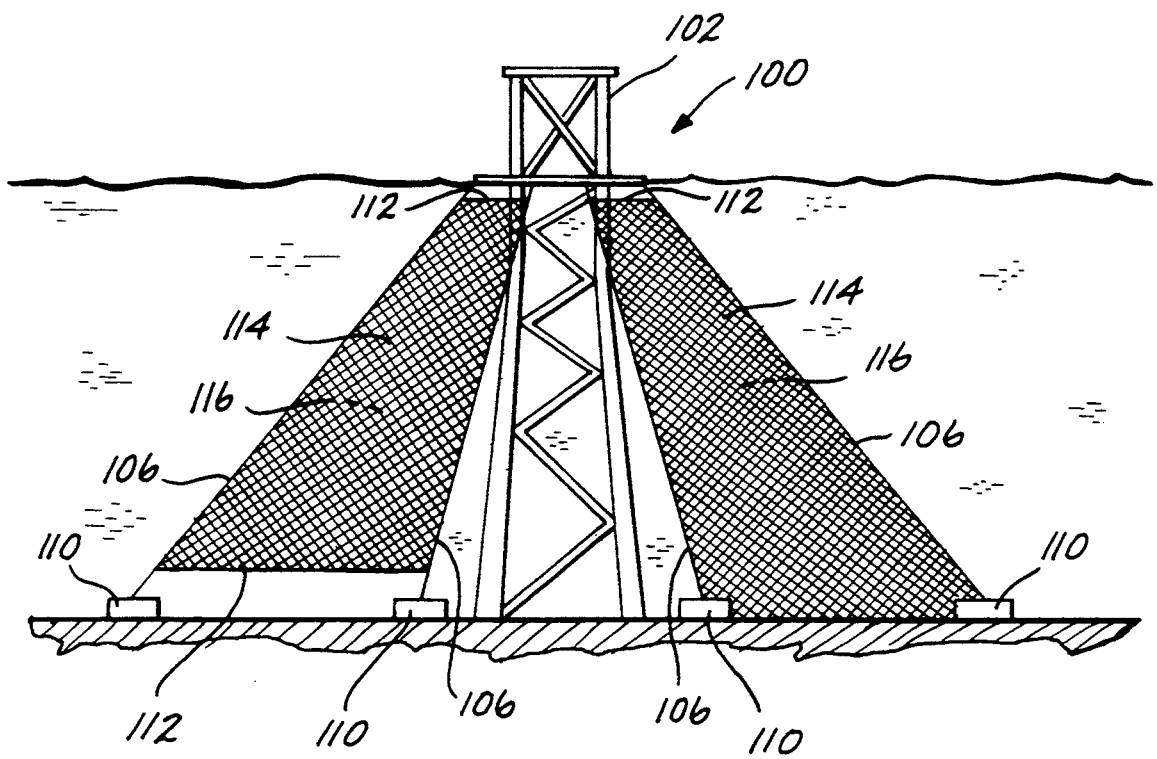
FIG. 5 is a side view of still another alternative embodiment of this invention.

Another alternative net pen 100 of this invention is illustrated by FIG. 5. The center spar of net pen 100 is a stationary structure like an offshore oil platform 102 or a spar buoy that has been secured to the sea bed. A rigging system 104 includes a number of radial lines 106. Each radial line 106 has a first end that is secured to the platform in the vicinity of the water line and a second end that is secured to an anchor 110 located away from the platform. In the depicted version of the invention the radial lines 106 are further arranged so that there are inboard radial lines connected to anchors 110 located adjacent the platform 102 and outboard radial lines that are connected to anchors that are spaced from the platform. Upper and lower horizontally oriented transverse lines 112 extend between the adjacent radial lines 106. Some of the transverse lines 112 extend between the adjacent inboard and outboard radial lines 106. Others of the transverse lines connect adjacent inboard radial lines 106 while still others of the transverse lines connect adjacent outboard radial lines.

A set of net panels 114 is suspended from the radial lines 106 and transverse lines 112 to define net spaces 116 in which marine life can be housed. In versions of the invention wherein the rigging system includes transverse lines 112 adjacent the floor of the body of water, a bottom net panel 114 forms the base of the net space 116. In other versions of the invention the net panels 114 may seated on the floor of the body of water and may be buried in the floor of the body of water to prevent the unwanted passage of marine life to and from the net space 116.

Figure 6:
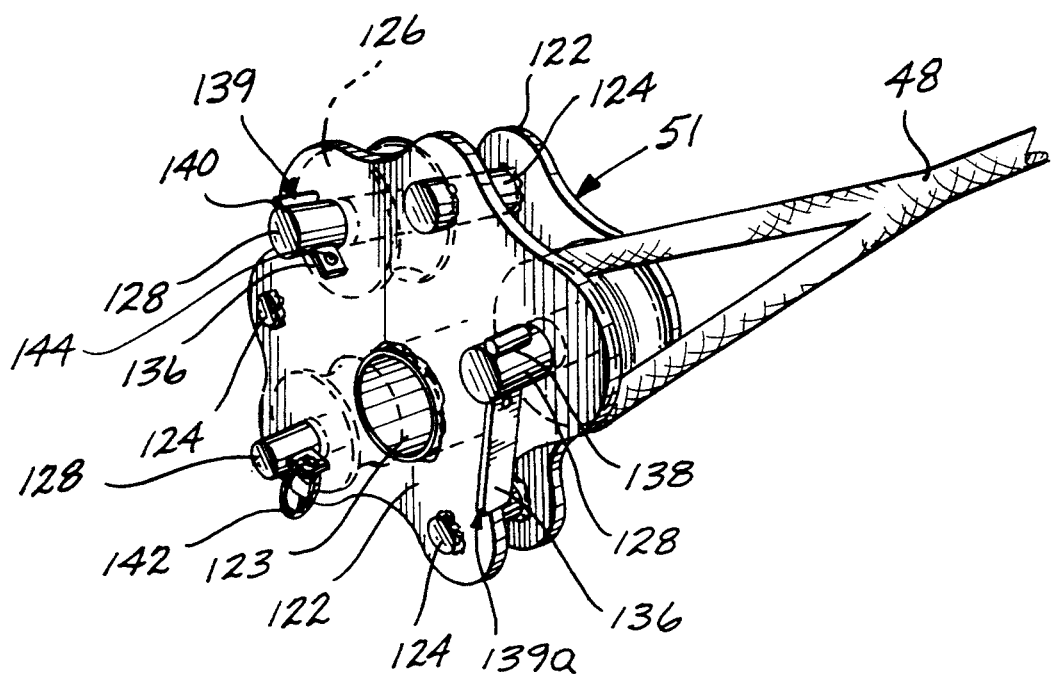
FIG. 6 is a perspective view of a gridline connector employed to couple the lines of the net pen of this invention.

FIG. 6 illustrates in detail the structure of a gridline connector and, more particularly, gridline connector 51, which is used to couple three lines to a single point. The gridline connector 51 includes a pair of spaced-apart cheek plates 122 that are connected by an open-ended tube 123 that extends between the plates. The opposed ends of tube 123 are secured in openings formed in the center of each cheek plate 122. Three solid posts 124 extend between the cheek plates 122. The posts 124 are located adjacent the outer edges of the cheek plates 122. As depicted with respect to the partially shown mooring line 48, each of the lines attached to the gridline connector is formed with eye-loops that are fitted over separate grommets 126 that are rotatably mounted to the cheek plates 122. The grommets 126 are formed of a high-strength plastic. Alternatively, the grommets 126 may be manufactured out of a composite material that has a high crush resistance such as the resin and Dacron fiber composite material marketed under the trade name Orkot by Orkot Engineering Plastics of Eugene, Oreg. The grommets 126 are mated to the cheek plates 122 so that their axes are spaced apart and parallel to each other. Each grommet 126 is mounted to the cheek plates 122 by a navy pin 128 that extends through concentric openings formed in the grommet and the cheek plates 122. Each navy pin 128 is held in place by a keeper lug 136 that extends through a slotted opening 138 formed in the tail end of the pin. Each keeper lug 136 is formed of an integral piece of metal that has a main body 139 in the form of a flat bar. A small, solid cylindrical head 140 is welded or otherwise secured to one end of the lug body 139 to prevent that end of the keeper lug 136 from passing through the navy pin 128. Movement of the opposed end of the keeper lug 136 through the navy pin is inhibited by a wire wrap 142 that extends through an opening 144 in the tail end of the lug body 139.

A keeper lug 136a having an elongated body 139, may also be used to hold the navy pin 128 in place. Keeper lug 136a is so designed that the center of gravity of the lug is located toward the tail end of the lug, as opposed to the end to which the lug head 140 is attached. An advantage of this design is that, if the wire wrap 142 inadvertently works free of the lug, the lug will stay in the heads-up position and remain fitted on the navy pin 128.

During the assembly of the net pen 10, the cheek plate subassembly is lowered into the water so that the various lines that are to be coupled to the gridline connector 51 can be attached thereto. The gridline connector 51 is held in position at the appropriate depth by a support line, not illustrated, that is hooked over one of the posts 124. The eye-looped end of line, for example, the mooring line 48 with a grommet 126 fitted in the loop, is then placed between the cheek plates 122. A navy pin 128 is then inserted into the concentric openings formed in the cheek plates 122 and the grommet 126 to hold the grommet in place. The keeper lug 136 is inserted through the tail end of the navy pin and a wire wrap 142 is fitted through the keeper lug to complete the coupling of the line to the gridline connector. Other lines are attached to the gridline connector 51 in a like manner.

When lines attached to connector 51 twist and turn in the water as a consequence of wave action pulling on the objects to which the lines are attached, the lines either float around the grommets 126 with which they are associated or the grommets rotate with the lines. This minimizes the likelihood of the lines abrading. The reduction in line abrasion, in turn, reduces the fraying of the lines, enhancing their useful lifetime. Moreover, gridline connector 51 does not include components that are secured together by complementary threading. Thus, unlike shackles and other conventional connectors, gridline connector 51 does not have threads that, over prolonged exposure to salt water, can rust away and fail. Another advantage of gridline connector 51 is that the posts 124 provide a means for coupling the gridline connector 51 to a line from a support vessel while the lines are being attached to the gridline connector. The fitting of the grommet-and-line between the cheek plates, the insertion of the navy pin through the cheek plates and grommet, the insertion of the keeper lug through the navy pin, and the wrapping of the wire through the keeper lug are all low physical effort tasks that can readily be performed even by divers when the gridline connector 51 is submerged. Thus, the gridline connector 51 of this invention provides a means for coupling lines together underwater, that can be easily assembled underwater, and that holds the lines together without imposing significant, lifetime-shortening, stress on the lines.

Figure 7:
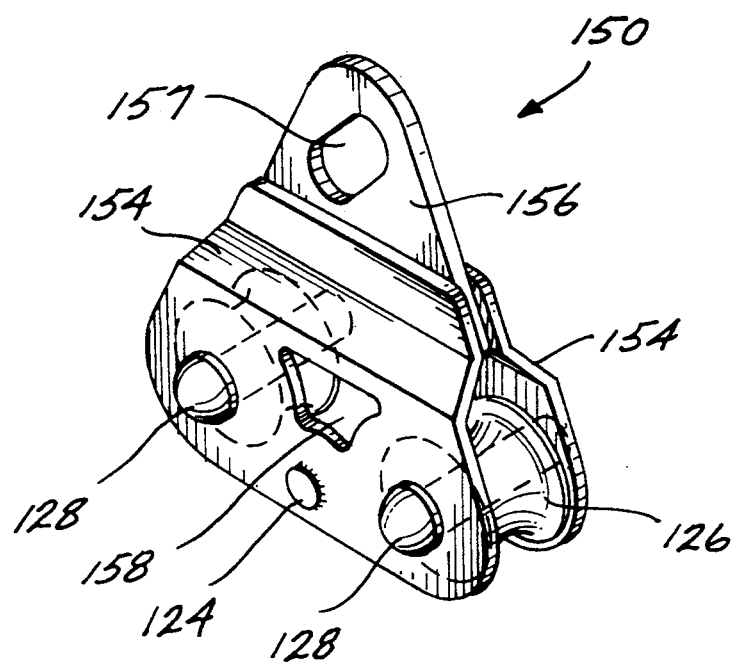
FIG. 7 is a perspective view of an alternative gridline connector of this invention.

An alternative gridline connector 150 is illustrated by FIG. 7. Gridline connector 150 includes a pair of cheek plates 152 to which two grommets 126 are attached. The cheek plates 152 each include a stepped tab 154 that is welded or otherwise secured to the opposed sides of a center plate 156 that extends away from the cheek plates 152. The center plate 156 is formed with an opening 157 to facilitate the coupling of the gridline connector 150 to another unit with a shackle or other rigid member. The cheek plates 152 are formed with openings 158 between the grommet attachments to reduce the overall weight of the gridline connector 150. A post 124 extends between the cheek plates adjacent the side of the connector opposite the side to which the center plate 156 is attached. The grommets 126 are held in place with the previously described navy pin/keeper lug/wire wrap assembly (FIG. 6).

The foregoing detailed description has been limited to specific embodiments of the invention. It will be apparent, however, that variations and modifications can be made to this invention with the attainment of some or all of the advantages thereof. For example, it should be clear that the floating spar buoy 14 of the first-described embodiment of the invention can be provided with a platform to allow personnel to tend the contents of the pen 10 therefrom. Furthermore, the shapes of the nets should similarly be understood to be illustrative and not limiting. For example, in some versions of the invention, it may be desirable to provide a net that is either circular or oblong in shape. Alternative nets may even be in the form of a polygon other than a square. In some versions of the invention, wherein the nets are secured to fixed towers 102, it may even be desirable to construct the nets so that a single net extends all the way around the platform to define a pen space that encircles the tower. Also, in some versions of the invention it may be desirable to provide the nets with interior panels that define subspaces within the larger pen spaces. Moreover, in some versions of the invention it may be desirable to provide stiffening members in the form of buoyant rods to hold in place the various sections of the net forming the pen space. It should be equally clear that the use of the supplemental spar buoys 86 is not restricted to embodiments of the invention wherein the center spar is firmly secured to the sea bed. These supplemental spar buoys 86 can readily be used with other versions of the invention wherein the center spar floats.

In a similar manner, it should be understood that use of the damper plate is exemplary and not limiting. In other versions of the invention there may not be any need to employ a damper plate and in still other versions of the invention there may be a need to employ multiple damper plates and/or damper plates that have a radically different construction from that disclosed in the application. It should similarly be recognized that there is no requirement that the spar-buoy pen of this invention always be constructed so that at least a portion of the pen extends above the water line. In some versions of the invention, the pen may be totally submerged but for an assembly of buoys and marker pennants. It further may be desirable to configure the attached spar buoy to some type of anchor that is resting on the ocean floor. Furthermore, it may also be desirable to construct some gridline connectors of this invention with bent cheek plates. This would make it possible to secure the grommets to the cheek plates so that they are at angles to each other. Therefore, it is the object of the appended claims to cover all such variations and modifications as come within the true spirit and scope of the invention.

The embodiments of the invention in which an exclusive property or privilege is claimed are defined as follows:

1. A spar buoy pen for use in a marine environment comprising:
   a substantially vertically oriented center spar extending above the sea bed;
   a rigging assembly including a set of lower radial lines attached to said center spar at a first location along the length of said center spar above the sea bed, and a set of upper radial lines connected to a second location on said center spar spaced from said first location wherein, said radial lines have distal ends spaced away from said center spar;
   a net disposed around said center spar having a top section attached to said upper radial lines and a bottom section attached to said lower radial lines whereby said net top and bottom sections are spaced apart and said net bottom section is located above the sea bed;
   a plurality of anchor assemblies, each said anchor assembly including an anchor, a mooring line having a first end attached to said anchor and a second end connected to the distal end of at least one radial line, and a tensioning assembly attached to said mooring line, said tensioning assembly maintaining said mooring line in a taut condition, wherein said anchor assemblies are positioned to urge said radial lines away from said center spar to suspend said net top and bottom sections away from said center spar to define an enclosed pen space and to maintain said net above the sea bed; and
   an access assembly for providing a selectively closeable opening into said pen space.

2. The spar buoy pen of claim 1, wherein said tensioning assembly includes a float attached to said mooring line.

3. The spar buoy pen of claim 2, said tensioning assembly further including a tensioning weight coupled to said mooring line wherein, said tensioning weight is located between said anchor and said float line.

4. The spar buoy pen of claim 3, wherein at least one said anchor assembly is configured so that:
   said mooring line has a free end distal from said anchor; said tensioning weight is attached to a supplemental line; said float is connected to a riser line; and said anchor assembly further includes:
   a gridline connector for coupling said mooring line free end, said supplemental line, and said riser line, said gridline connector including: a pair of spaced-apart cheek plates; at least one member rigidly extending between said cheek plates; three grommets located between said cheek plates wherein said grommets are rotatably and releasably mounted to said cheek plates along spaced-apart axes and wherein said mooring line, said supplemental line, and said riser line are each looped around a separate one of said grommets.

5. The spar buoy pen assembly of claim 4, wherein said at least one anchor assembly further includes:
a float line connecting said float;
a spring line extending from said float line;
a second said gridline connector having three axially spaced grommets wherein said riser line, said float line, and said spring line are wrapped around separate ones of said grommets;
a pair of breast lines extending between said spring line wherein one said breast line is connected to an upper radial line and a second said breast line is connected to a lower radial line; and
a third said gridline connector having three axially spaced grommets wherein said spring line and said breast lines are wrapped around separate ones of said grommets.

6. The spar buoy pen assembly of claim 4, wherein: said grommets and said cheek plates are formed with concentric openings; each said grommet is mounted to said cheek plate by a pin extending through said grommet opening and said cheek plate openings associated therewith, said pin having a first end dimensioned to be fitted through said grommet and cheek plate openings and located adjacent an outer surface of one of said cheek plates, a second end with a pin head located adjacent an outer surface of the second of said cheek plates, and a pin opening extending laterally through said pin adjacent said pin first end; a separate keeper lug disposed in each said pin opening to prevent movement of said pin through said cheek plate, said keeper lug having a head at one end and an opening at a second end; and a wire wrap disposed in said keeper lug opening to releasably secure said keeper lug to said pin.

7. The spar buoy pen of claim 1, wherein said tensioning assembly includes a tensioning weight attached to said mooring line at a location distal from said anchor.

8. The spar buoy pen of claim 1, wherein said center spar is a spar buoy adapted to float substantially vertically.

9. The spar buoy pen of claim 1, wherein said center spar is a tower secured to the ocean floor.

10. The spar buoy pen of claim 1, wherein said access assembly includes a drop panel integral with said net top section and at least drop line integral with said rigging assembly and attached to said drop panel for raising and lowering said drop panel.

11. A spar buoy pen for use in a marine environment comprising:
a spar buoy adapted to float in a substantially vertical orientation;
a rigging assembly including a set of lower radial lines attached to said center spar at a first location along the length of said spar buoy; and a set of upper radial lines connected to a second location on said spar buoy spaced from said first location wherein said radial lines have distal ends spaced away from said spar buoy;
a net disposed around said spar buoy having a top section attached to said upper radial lines and a bottom section attached to said lower radial lines whereby said net top and bottom sections are spaced apart;
a plurality of anchor assemblies, each said anchor assembly including an anchor and a mooring line having a first end attached to said anchor and a second end attached to the distal end of at least one radial line wherein, said anchor assemblies are positioned to urge said radial lines away from said center spar to suspend said net top and bottom sections away from said center spar to define a pen space;
an access assembly for providing a selectively closeable opening into said pen space; and
a plurality of tensioning assemblies, each said tensioning assembly attached to a separate one of said mooring lines so as to maintain said mooring line in a taut condition.

12. The spar buoy pen of claim 11 wherein said access assembly comprises a movable drop panel in one of said net top sections and said rigging assembly lines include a set of drop lines attached to said drop panel for raising and lowering said drop panel.

13. The spar buoy pen of claim 12 wherein said spar buoy extends at least partially above the water line and said upper radial lines are attached to said center spar above the water line so that at least a portion of said net section is above the water line to enclose said pen space.

14. The spar buoy pen of claim 11 further including at least one damper plate suspended below said spar buoy.

15. The spar buoy pen of claim 11 wherein each of said tensioning assemblies includes a tensioning weight attached to the mooring line of the corresponding anchor assembly so as to be located between said first and second ends of said mooring line.

16. A spar buoy pen for use in a marine environment comprising:
a fixed tower secured to the sea bed;
a rigging assembly including a set of lower radial lines attached to said tower at a first location along the length of said tower; and a set of upper radial lines connected to a second location on said tower spaced from said first location wherein said radial lines have distal ends spaced away from said tower;
a net disposed around said tower having a top section attached to said upper radial lines and a bottom section attached to said lower radial lines whereby said net top and bottom sections are spaced apart;
a plurality of anchor assemblies, each said anchor assembly including an anchor and a mooring line having a first end attached to said anchor and a second end attached to the distal end of at least one radial line wherein said anchor assemblies are positioned to urge said radial lines away from said tower to suspend said net top and bottom sections away from said center spar to define a pen space;
an access assembly for providing a selectively closeable opening into said pen space; and
a plurality of float assemblies, each said float assembly attached to a separate one of said mooring lines.

17. The spar buoy pen of claim 16, wherein said net includes a plurality of net panels that are secured to said rigging assembly and are arranged to form a plurality of net spaces.

18. The spar buoy pen of claim 16, wherein at least one of said float assemblies includes an elongated spar buoy adapted to float in a substantially vertical orientation.

19. The spar buoy pen of claim 16, wherein said access assembly comprises a movable drop panel and said rigging assembly includes a set of drop lines attached to said drop panel for raising and lowering said drop panel.

20. A gridline connector for connecting at least two lines, each line having a looped end, said connector comprising:
- a cheek plate assembly comprising two spaced apart cheek plates and at least one member rigidly extending between said cheek plates, said cheek plates being formed with at least two pairs of coaxial openings;
- at least two grommets located between said cheek plates, each said grommet being formed with an opening and positioned so that said grommet openings is axially aligned with one of said pairs of cheek plate openings, and said grommets are spaced apart from each other so that each of the line looped ends can be fitted around a separate one of said grommets; and
- a plurality of fastening assemblies for rotatably and releasably securing said grommets to said check plate assembly, each said fastening assembly including: a pin extending through said coaxial cheek plate and grommet openings, said pin having a first end dimensioned to be fitted through said cheek plate and grommet openings and located adjacent an outer surface of one said cheek plates and having an opening formed therein and a second end opposite said first end with a pin head located adjacent an outer surface of the other of said cheek plates; a keeper lug releasably seated in said opening of said first end of said pin to prevent movement of said pin through said cheek plate and grommet openings; and a detachable restraining member attached to said keeper lug to releasably secure said keep lug to said pin.

21. The gridline connector of claim 20 wherein said restraining member is a wire wrap releasably secured in said keeper lug body opening.

22. The gridline connector of claim 20 further including an open ended tube extending between said cheek plates wherein said tube is located at approximately the center of said cheek plates and at least one post extending between said cheek plates wherein said post is located adjacent the perimeter of said cheek plates.

23. The gridline connector of claim 20 wherein said cheek plates are connected together.

24. The gridline connector of claim 20 wherein said cheek plates are secured to a center plate that extends away from said cheek plates.

* * * * *

UNITED STATES PATENT AND TRADEMARK OFFICE
CERTIFICATE OF CORRECTION

PATENT NO. : 5,359,962  
DATED : November 1, 1994  
INVENTOR(S) : G.F. Loverich

Page 1 of 3

It is certified that error appears in the above-indentified patent and that said Letters Patent is hereby corrected as shown below:

COLUMN     LINE

[56]     Refs. Cited    Insert:  
       (U.S. Pats.)    --   85,126    12/1868    Pitt             43/7X  
                                 215,031    5/1879     Webb            43/103  
                               1,485,875    3/1924     O'Malley       43/103  
                               4,147,130    4/1979     Goguel          119/3  
                               4,244,323    1/1981     Morimura      119/3  
                               4,257,350    3/1981     Streichenberger 119/3  
                               4,615,301    10/1986    Maekawa et al. 119/3  
                               4,747,369    5/1988     Götmalm       119/3  
                               4,957,064    9/1990     Koma              119/3  
                               4,982,697    1/1991     Neff               119/3  
                               5,007,376    4/1991     Loverich et al. 119/3--

[56]     Refs. Cited    Insert:  
       (For. Pats.)    -- 0 130 198    3/1978     Ger. Dem. Rep. 119/3  
                               0 254 517    3/1988     Ger. Dem Rep.   119/3  
                               87/03170     6/1987     PCT                  119/3  
                               1 499 468    2/1978     United Kingdom 119/3  
                               2 184 631    7/1987     United Kingdom 119/3  
                               2 189 671    11/1987    United Kingdom 119/2--

UNITED STATES PATENT AND TRADEMARK OFFICE
CERTIFICATE OF CORRECTION

PATENT NO. : 5,359,962
DATED : November 1, 1994
INVENTOR(S) : G.F. Loverich

It is certified that error appears in the above-indentified patent and that said Letters Patent is hereby corrected as shown below:

| COLUMN | LINE | |
|---|---|---|
| 2 | 16 | "or the center" should read --of the center-- |
| 2 | 54 | "waveinduced" should read --wave-induced-- |
| 3 | 63 | "onehalf" should read --one-half-- |
| 4 | 5 | "ranged" should read --arranged-- |
| 4 | 10 | "as illustrated" should read --, as illustrated-- |
| 7 | 57 | "may seated" should read --may be seated-- |
| 11 (Claim 10, | 53 Line 3) | "least drop" should read --least one drop-- |
| 12 (Claim 13, | 28 Line 5) | "section" should read --top section-- |
| 13 (Claim 20, | 15 & 16 Line 12) | "openings is" should read --opening is-- |
| 13 (Claim 20, | 22 Line 18) | "check" should read --cheek-- |

UNITED STATES PATENT AND TRADEMARK OFFICE
CERTIFICATE OF CORRECTION

PATENT NO. : 5,359,962

DATED : November 1, 1994

INVENTOR(S) : G.F. Loverich

It is certified that error appears in the above-indentified patent and that said Letters Patent is hereby corrected as shown below:

| COLUMN | LINE | |
|---|---|---|
| 14 (Claim 20, | 2 Line 24) | "one said" should read --one of said-- |
| 14 (Claim 20, | 11 Line 33) | "keep lug" should read --keeper lug-- |
| 14 (Claim 24, | 23 Line 1) | "claim 20" should read --claim 23-- |

Signed and Sealed this

Twenty-seventh Day of June, 1995

Attest:

BRUCE LEHMAN

Attesting Officer     Commissioner of Patents and Trademarks